United States Patent [19]

Angarola et al.

[11] 4,146,070
[45] Mar. 27, 1979

[54] DUNNAGE BAG INFLATION AIR GUN

[75] Inventors: Barry R. Angarola, Schaumburg; A. L. Nocom, Des Plaines, both of Ill.

[73] Assignee: Signode Corporation, Glenview, Ill.

[21] Appl. No.: 820,210

[22] Filed: Jul. 29, 1977

[51] Int. Cl.² ............................................. B65B 1/18
[52] U.S. Cl. ................................. 141/68; 137/223; 141/349; 239/419.5; 417/179
[58] Field of Search ............... 46/90; 137/223, 851, 137/852, 853; 141/10, 67, 68, 114, 285, 286, 301, 313–317, 324, 348, 349, 350, 367, 382, 387, 389, 392; 251/149.7; 239/419.5, 425.5; 417/179, 182

[56] References Cited
U.S. PATENT DOCUMENTS 2,866,593 12/1958 Bowman et al. ............... 417/179 X
3,994,324 11/1976 Zeyra ................................ 141/349

Primary Examiner—Richard E. Aegerter
Assistant Examiner—Frederick R. Schmidt
Attorney, Agent, or Firm—Dressler, Goldsmith, Clement, Gordon & Shore, Ltd.

[57] ABSTRACT

A hand held gun-type air injection device is provided for rapidly filling an inflatable dunnage bag with entrained ambient air to a predetermined maximum stabilized pressure level. The injection device is adapted for use specifically with a dunnage bag having a housing defining a chamber extending from an opening on the exterior of the bag to an opening in the interior of the bag. A tube assembly is provided for supplying pressurized gas or air adjacent the housing on the dunnage bag. A ring-like alignment frame is provided on one end of the tube for locating the tubing relative to the housing and in alignment with the chamber in the housing. The alignment frame is substantially open or apertured to permit free flow of ambient air past exterior portions of the tube into the chamber. One or more orifices are located on a portion of the tube to allow discharge of jets of high pressure gas or air therethrough. The orifices are arranged and located in the tube with respect to the ring-like alignment frame so that they are spaced from the walls of the housing chamber when the gun is engaged with the housing, whereby, as the jets of pressurized gas are discharged into the chamber, ambient air is aspirated from between the orifices and the chamber through the chamber into the dunnage bag.

23 Claims, 30 Drawing Figures

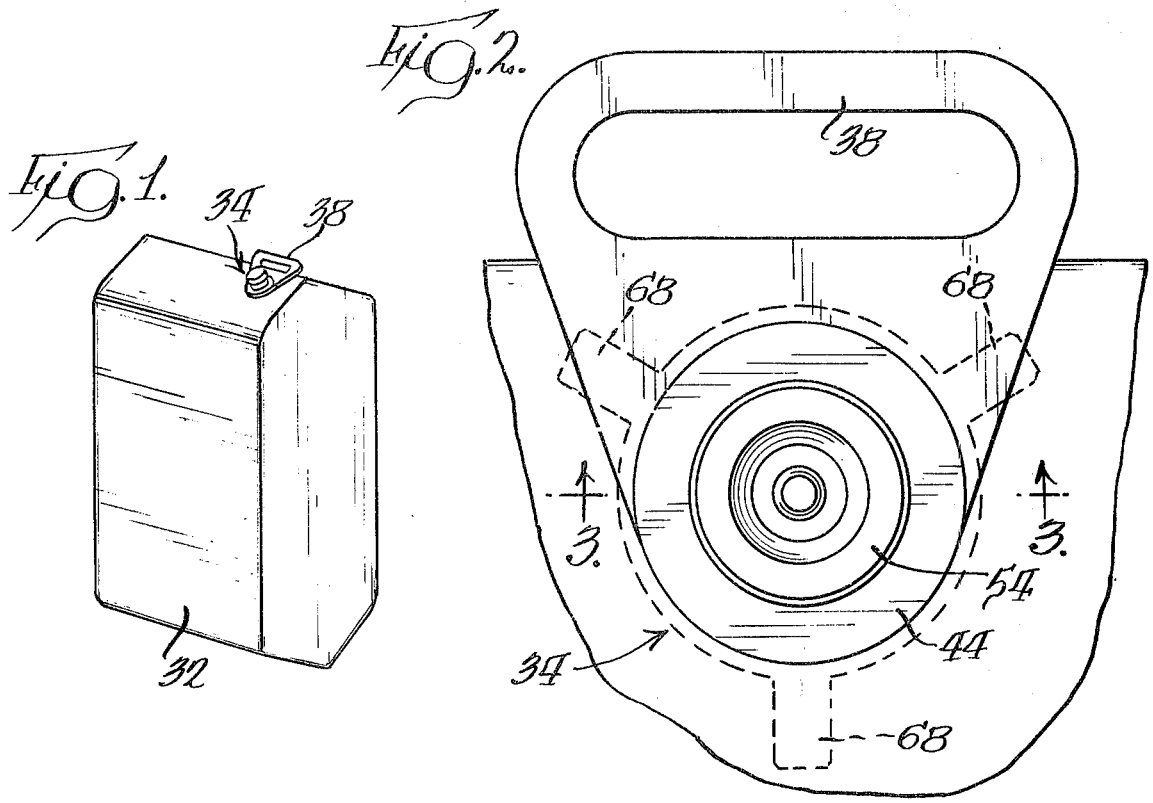
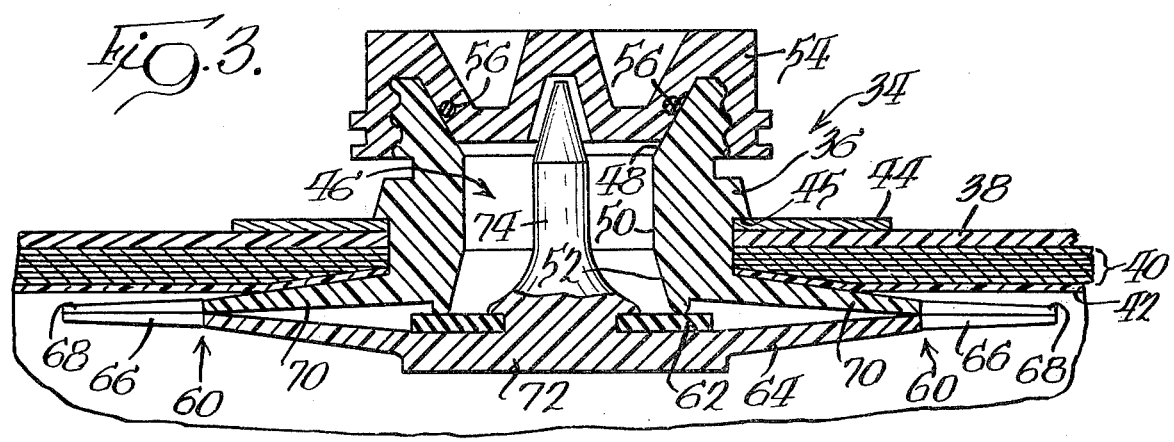
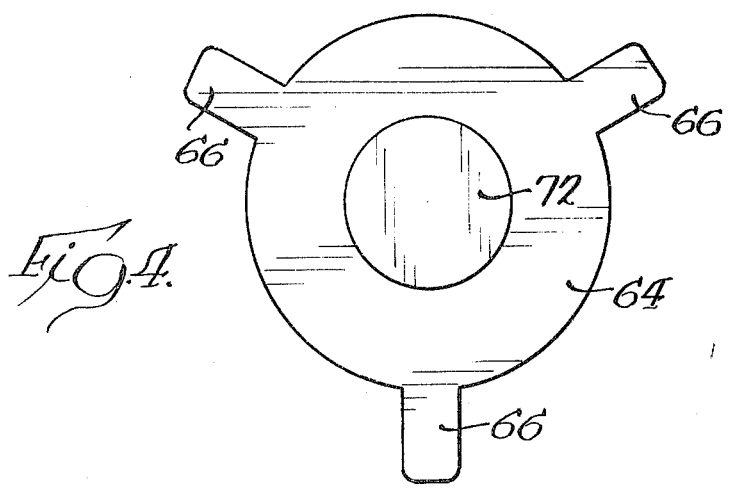

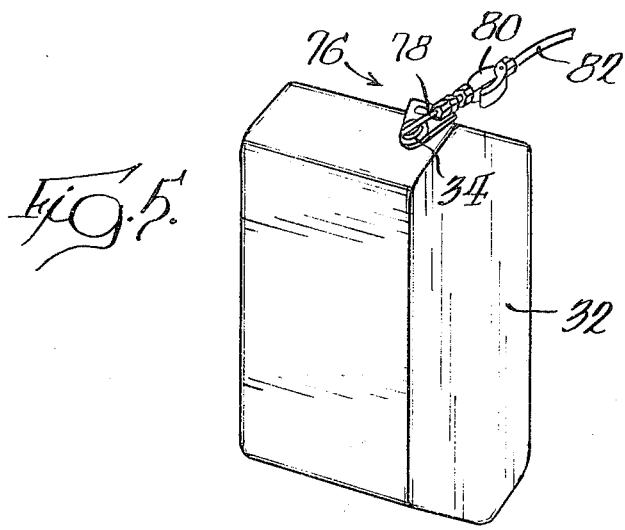
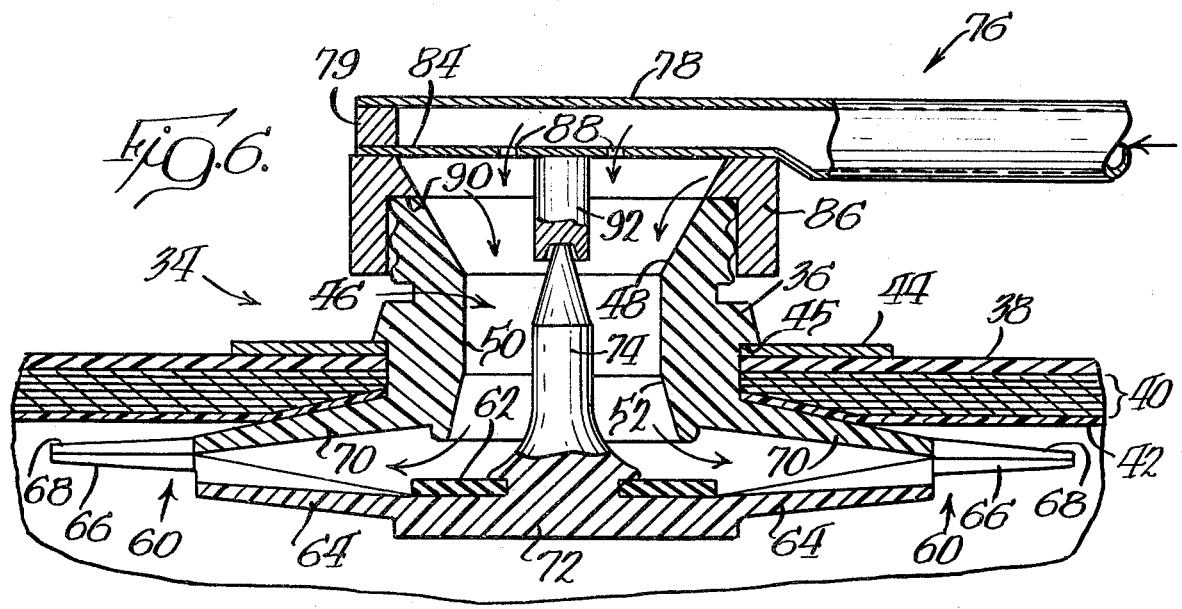
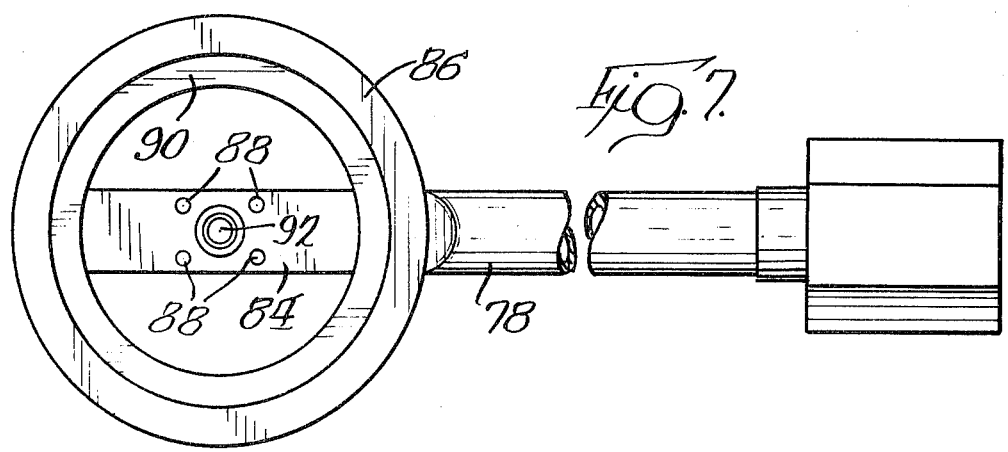

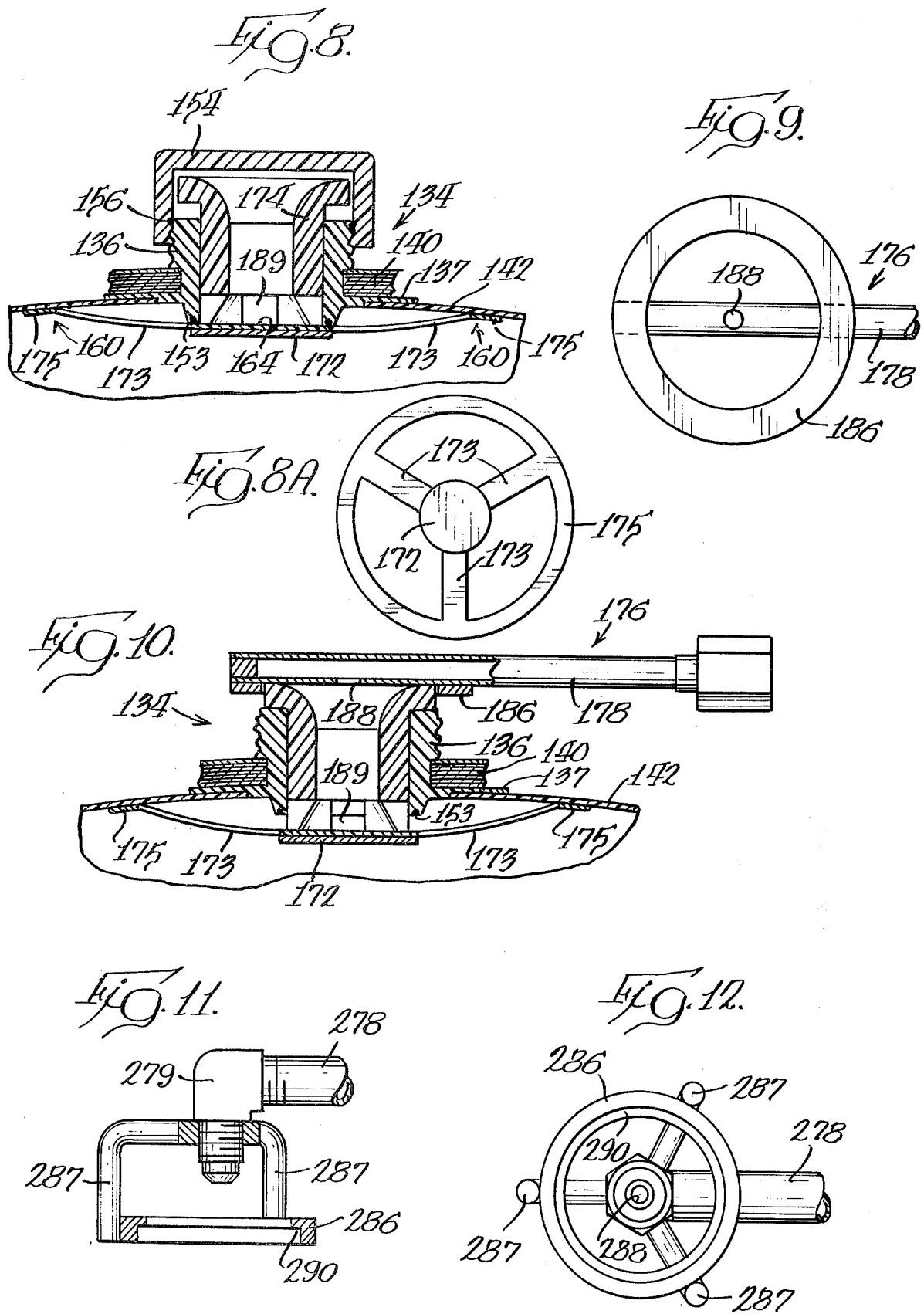

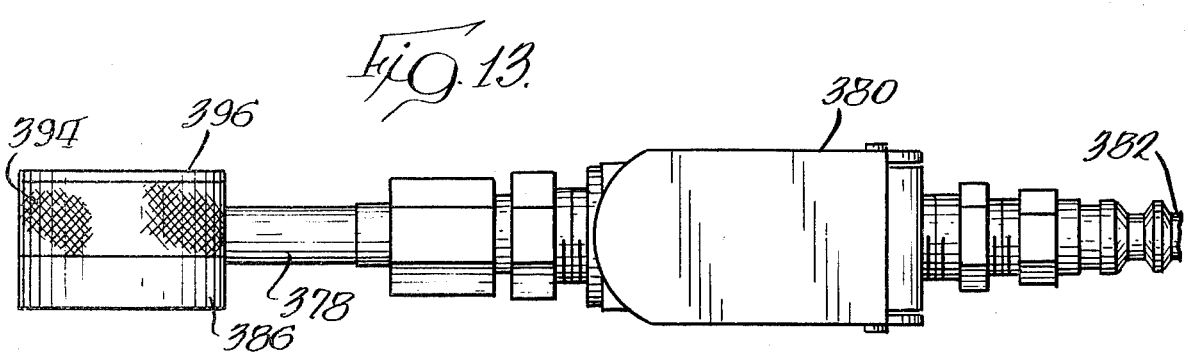
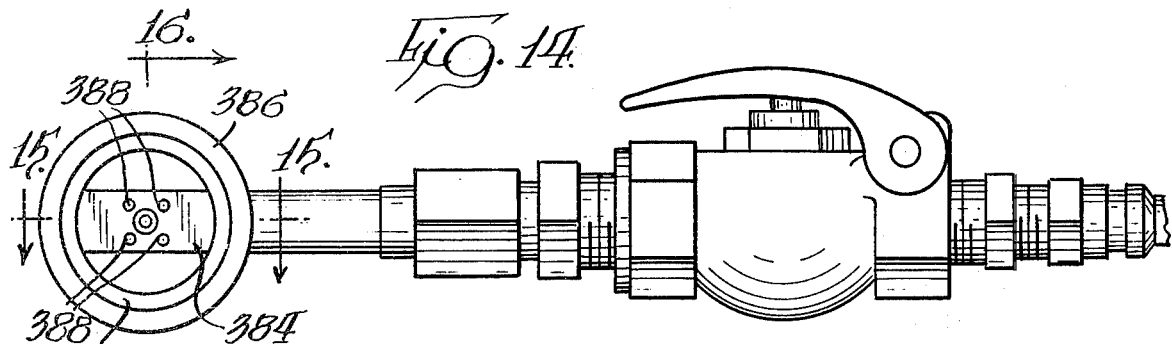
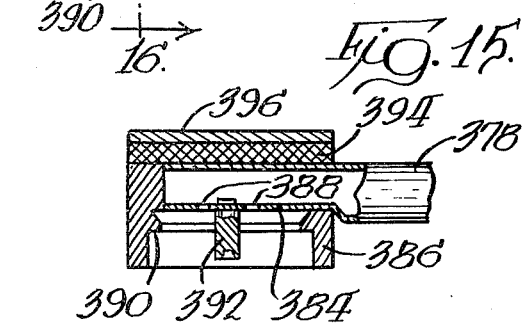
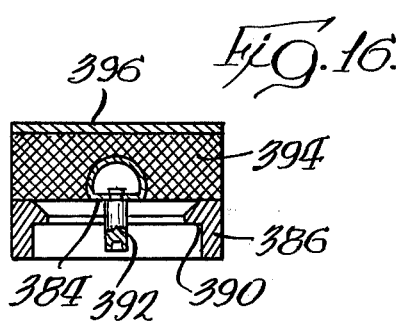
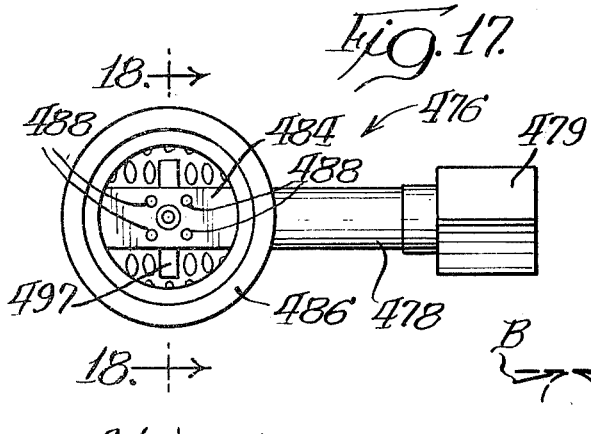
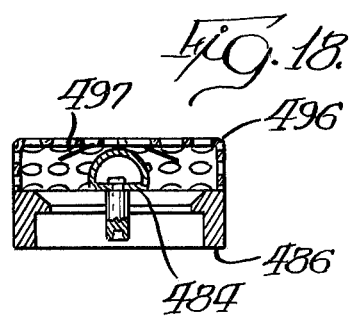
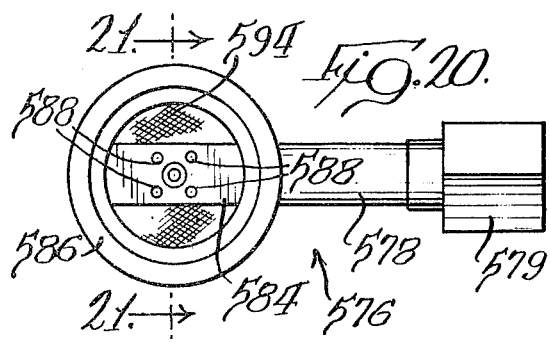
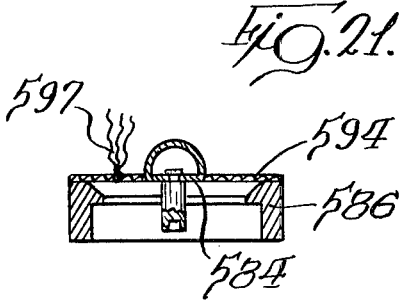

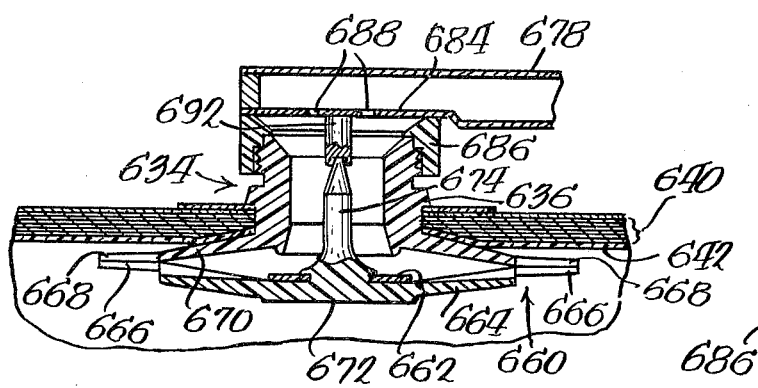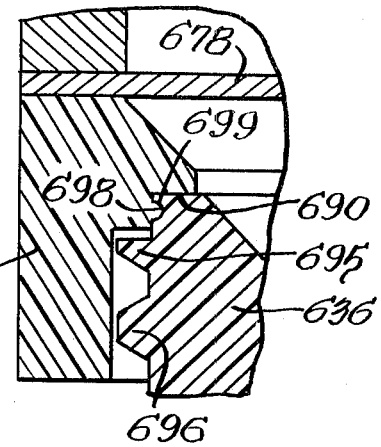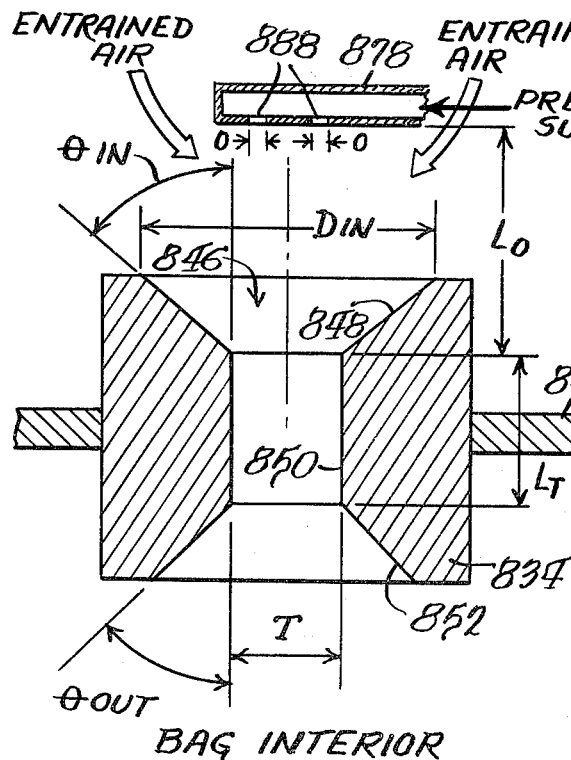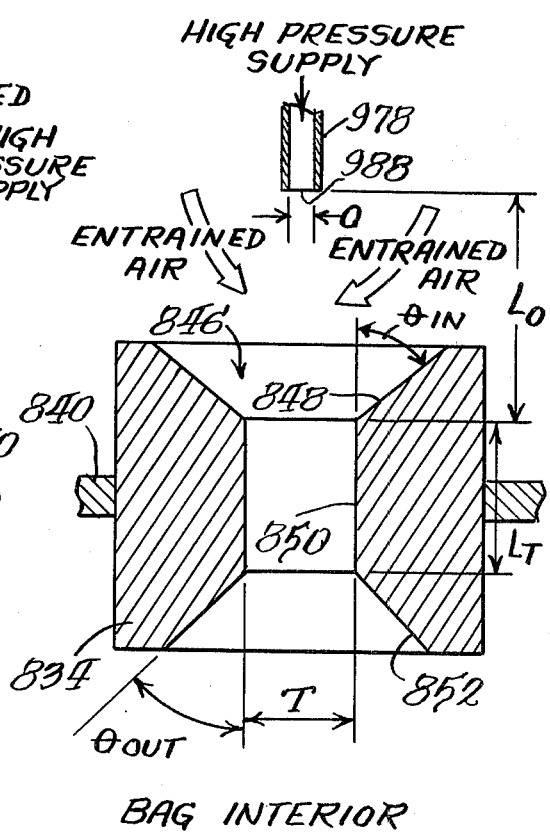

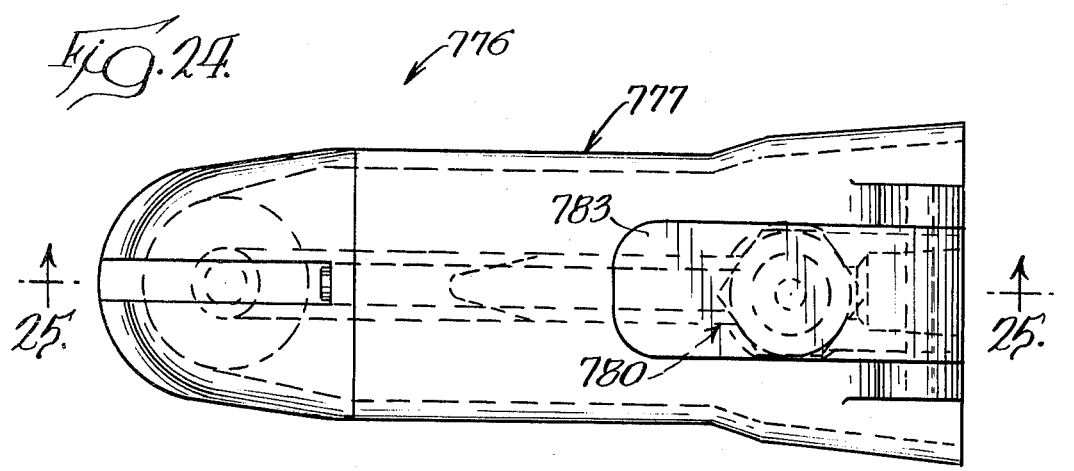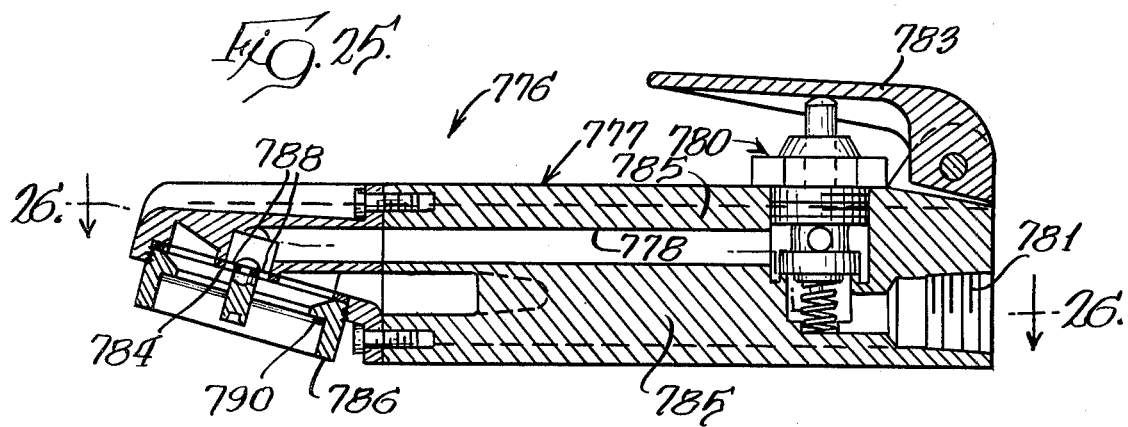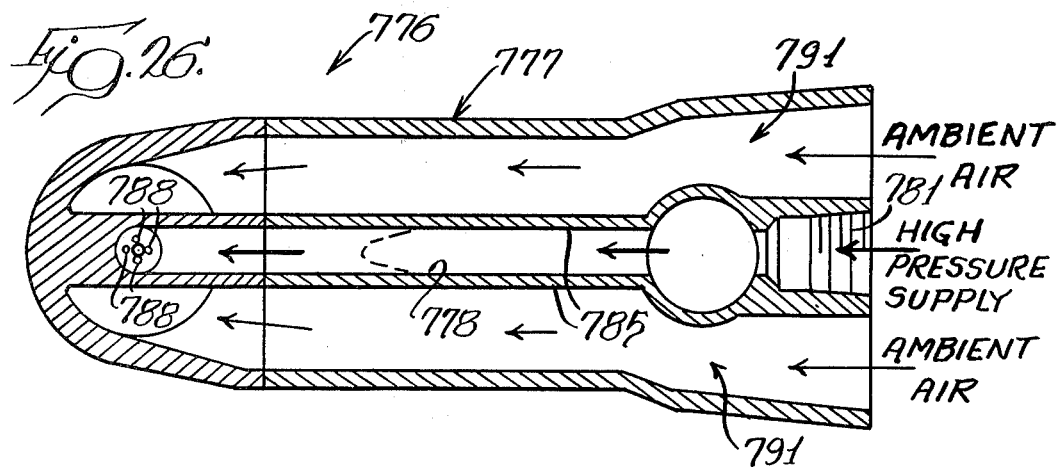

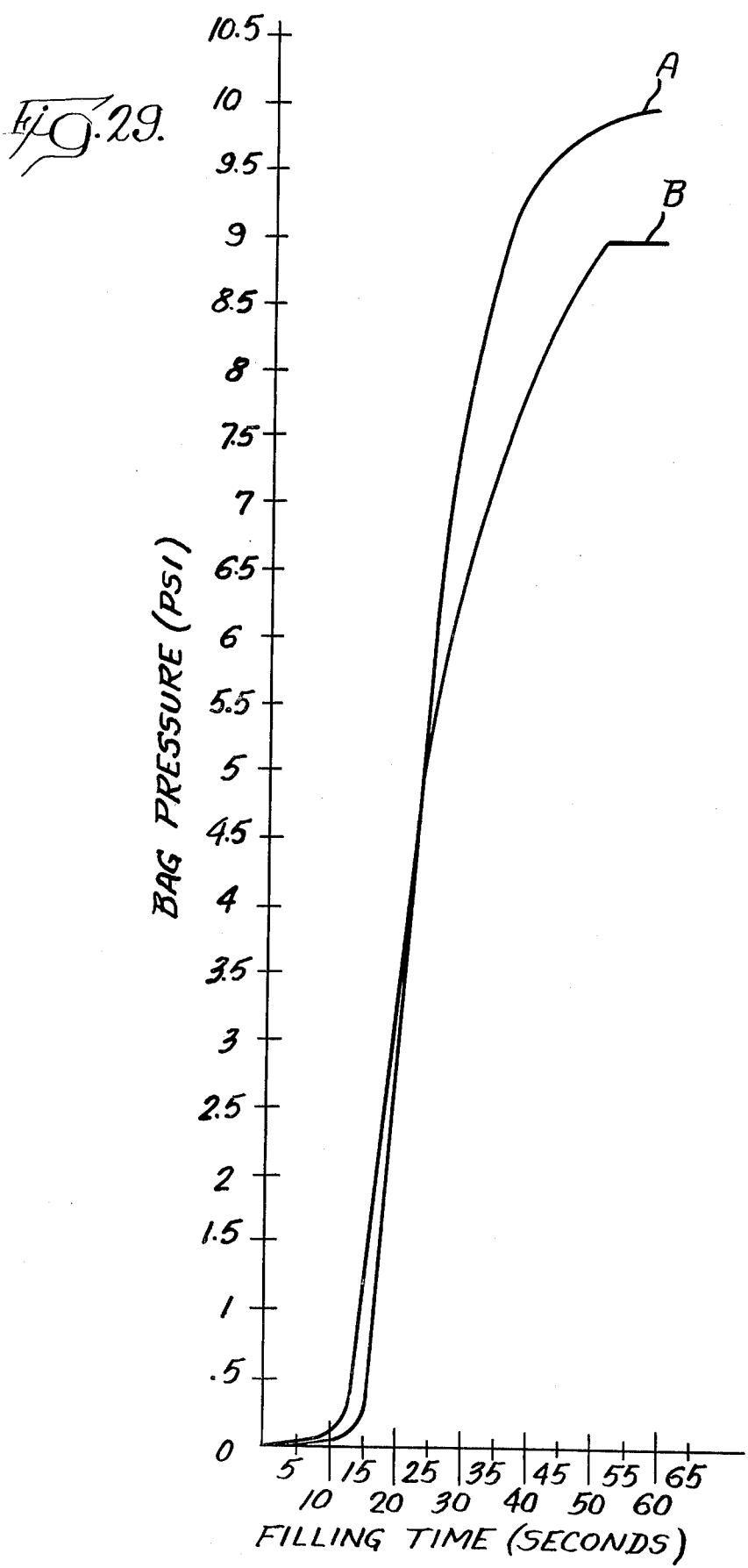

4,146,070

DUNNAGE BAG INFLATION AIR GUN

BACKGROUND OF THE INVENTION

This application is related to the concurrently filed Angarola et al. applications, Ser. Nos. 820,163 and 820,162, entitled, respectively, "Dunnage Bag Fill Valve", and "Apparatus for Rapidly Inflating and Pressurizing a Dunnage Bag", and U.S. Pat. No. 4,102,364 Leslie et al. entitled "Method of Dunnage Bag Inflation".

This invention relates to dunnage bags for use in shipment of freight by rail, ship, truck, aircraft and the like, and more particularly to inflatable disposable dunnage bags for such use. Typically, such dunnage bags have a gas-tight bladder (usually polyethylene) surrounded by an outer protective and supportive shroud consisting of a number of plies of heavy paper. The inflatable, disposable dunnage bags are used in freight carriers where it is customary to fill the spaces between the cargo, or between the cargo and the walls of the freight carrier, to prevent the cargo from shifting and damaging either the cargo itself and/or the walls of the freight carrier. Inflatable, disposable dunnage bags are placed between the cargo in a deflated condition and are subsequently inflated with a gas, usually air, to a certain design pressure, typically between 1 and 8 pounds per square inch gauge, dependent on the size and wall structure of the particular bag.

Experience with this type of dunnage bag has revealed certain difficulties during inflation. First, in the United States, such dunnage bags are normally inflated with high pressure air nozzles through a valve in the side of the bag. Typically, the high pressure air ranges between 30 and 120 pounds per square inch gauge. Thus, unless the air pressure is carefully regulated (as by means of a pressure regulating device near the discharge of the air hose), it is quite easy to pressurize a bag beyond the design, or allowable, pressure limit and to thereby rupture the bag and possibly damage the cargo and/or carrier. Thus, it would be desirable to provide a means for filling such dunnage bags using a gas such as air without the danger of overpressurization.

It has been suggested that low pressure air could be used. However, the use of low pressure air, by itself, has a number of drawbacks. First, the time required to fill a dunnage bag would typically be longer than the time required to fill a dunnage bag when using high pressure air. Also, a dunnage bag can still be overpressurized and ruptured when using low pressure air unless the particular "low" pressure is adjusted low enough for the particular dunnage bag. This may damage the cargo. Thus, in situations where a number of different sizes of dunnage bags (having different design fill pressures) are to be inflated with the same low pressure air supply, the low pressure air supply pressure would still have to be carefully regulated to accommodate each different bag being filled. To overcome these drawbacks, it would be desirable to provide a means for filling different design pressure dunnage bags with low pressure air relatively rapidly and yet also have an automatic self-limiting feature with respect to the maximum pressure which could be supplied to a particular bag. Specifically, it would be desirable to provide a dunnage bag filling device which could be used with various sizes of dunnage bags having various different maximum allowable fill pressures and which, when operated from a given constant air supply pressure in cooperation with the particular valve on each of the various dunnage bags, would permit filling of the dunnage bags to, but not in excess of, their respective allowable design pressure levels.

Another problem encountered with the filling of inflatable dunnage bags results from the fact that such bags are filled after they have been placed and positioned between cargo or between the walls of the freight carrier and the cargo. Consequently, there are many times when access to the fill valve on the dunnage bag is extremely limited. In those instances, there is very little clearance area around a fill valve and this precludes the use of large, elongated gun-type air injection mechanisms that stick out a number of inches from the top of the valve during inflation. Consequently, it would be desirable to provide an air injection device which could be mounted on the dunnage bag fill valve and which would project only a relatively short distance from the top of the valve.

SUMMARY OF THE INVENTION

In the instant invention, an air injection device is provided for use with inflatable dunnage bags having a fill housing defining a chamber extending from an opening on the exterior of the bag to an opening in the interior of the bag. The housing may or may not have a valve closure means. In general, it is contemplated that the air injection device of the instant invention is placed on, or engaged with, a portion of the housing on the dunnage bag in a particular manner whereby one or more jets of pressurized gas, such as air, are injected into the chamber and whereby ambient air is entrained into the chamber past the injection device and into the housing.

The structure of the air injection device of the present invention can be used with a housing chamber having an inlet cross-sectional flow area equal to or greater than the sum of the cross-sectional areas of the discharging injection gas jets and this enables relatively large amounts of entrained ambient air to be aspirated through the valve which fills the bag fairly rapidly. Further, the amount of pressurized gas thus used is only a small fraction of the entrained ambient air which is aspirated through the housing chamber.

It is contemplated that the injection device of the instant invention can be used, for a given fixed construction, with various sizes of dunnage bags having various allowable design fill pressure levels. To this end, the fill housing or fill valves of the differently sized bags are provided with differing internal cross-sectional area dimensions. The ultimate pressure that may be achieved within a given bag has been found to be dependent on, among other things, the specific dimensions of the chamber in the fill housing or valve. Thus, with a given construction of the air injection device of the present invention, dunnage bags having differing maximum allowable pressure level requirements can be fabricated with fill valves having differing internal chamber dimensions but having the same exterior dimensions suitable for engagement with the air injection device. With a proper matching of valve sizes with a specific air injection device, the single air injection device will have the capability of filling various sizes of dunnage bags, with each bag being filled to its maximum allowable pressure level and not in excess thereof. Thus, a single gun or air injection device of the present invention can be used in the field with a single preset pressure supply to fill a number of variously sized bags.

In the preferred embodiment, the air injection device of the present invention has a hollow tubular member which can be connected to an air supply hose, or to an on-off valve on an air supply hose, and which functions to provide a rigid conduit for bringing the pressurized air or gas to the vicinity of, or adjacent to, the dunnage bag fill valve or fill housing. Mounted on the tubular member, near one end, is a ring-like alignment frame having an annular shoulder adapted to seat on the exterior portion of a cylindrical dunnage bag housing or fill valve so as to effect a relative alignment between the tubular member and the housing wherein the tubular member extends across the diameter of the chamber defined by the housing. When the air injection device is so engaged with the fill valve, ambient air is free to flow between the exterior portions of the tubular member and the chamber.

Circular gas jet discharge orifices are provided in a flattened wall portion of the type facing the chamber of the dunnage bag fill bag or housing. The orifices are spaced at equal intervals about the perimeter of a circle in the flattened wall portion with the circle of orifices being substantially concentric with the ring-like alignment frame and thus having a central axis substantially coincident with the central axis of the dunnage bag fill housing or valve. Preferably the diameter of the circle or orifices is less than the diameter of the exterior inlet opening of the valve chamber such that the orifices are spaced inwardly from the wall of the chamber and such that gas is discharged from the orifices and into and through the chamber, thereby aspirating ambient air from between the orifices and the chamber walls through the chamber and into the dunnage bag.

The tubular member is preferably a cylindrical tube with a diameter on the order of between 0.5 inch and 0.25 inches. The flattened wall portion of the tube (which contains the orifices) is preferably located by the ring-like alignment frame less than 0.125 inches above the top of the dunnage bag fill housing or valve. Thus, the total projection of the inflation device beyond the outermost portion of the dunnage bag fill housing or valve is 9/16 inch or less. Such a relatively small projecting engagement dimension is extremely advantageous from the standpoint of filling dunnage bags in situ between cargo items where only a few inches of clearance may exist around the dunnage bag fill valve or housing.

Numerous other advantages and features of the present invention will become readily apparent from the following detailed description of the invention and embodiments thereof, from the claims and from the accompany drawings.

BRIEF DESCRIPTION OF THE DRAWINGS

In the accompanying drawings forming part of the specification, and in which like numerals are employed to designate like parts throughout the same, FIG. 1 is a perspective view of an inflated dunnage bag with a fill valve device located on one end of the bag and adapted to be used with the air injection device of the present invention;

FIG. 2 is an enlarged, partial top plan view of the fill valve device and dunnage bag;

FIG. 3 is a cross-sectional view taken generally along the plane 3—3 of FIG. 2;

FIG. 4 is a bottom plan view of the valve illustrated in FIG. 3;

FIG. 5 is a perspective view of the dunnage bag illustrated in FIG. 1 showing a first embodiment of the air injection device engaged with the fill valve device;

FIG. 6 is an enlarged cross-sectional view of the air injection device and fill valve device illustrated in FIG. 5;

FIG. 7 is a bottom plan view of the air injection device of the present invention;

FIG. 8 is a cross-sectional view of a second type of fill valve device adapted for use with a second embodiment of the air injection device of the present invention;

FIG. 8A is a reduced bottom plan view of the lower flexibly hinged biasing structure of the second embodiment of the fill valve;

FIG. 9 is a partial plan view of the bottom of a second embodiment of the air injection device of the present invention;

FIG. 10 is a cross-sectional view of the second embodiment of the air injection device shown engaged with the second type of dunnage bag fill valve device;

FIG. 11 is a partial side view of a third embodiment of the air injection device of the present invention;

FIG. 12 is a partial plan view of the bottom of the third embodiment of the device of the present invention;

FIG. 13 is a side view of the fourth embodiment of the device of the present invention shown connected to a manually operated on-off valve;

FIG. 14 is a plan view of the bottom of the fourth embodiment of the air gun of the present invention;

FIG. 15 is a cross-sectional view taken generally along the plane 15—15 of FIG. 14;

FIG. 16 is a cross-sectional view taken generally along the plane 16—16 of FIG. 14;

FIG. 17 is a plan view of the bottom of a fifth embodiment of the device of the present invention;

FIG. 18 is a cross-sectional view taken generally along the plane 18—18 of FIG. 17.

FIG. 19 is an enlarged, detailed view of a telltale device incorporated in the fifth embodiment of the device of the present invention showing two moved positions of the telltale device during operation;

FIG. 20 is a plan view of the bottom of a sixth embodiment of the device of the present invention;

FIG. 21 is a cross-sectional view taken generally along the plane 21—21 of FIG. 20;

FIG. 22 is a cross-sectional view of a seventh embodiment of the device of the present invention shown engaged with a third type of dunnage bag fill valve;

FIG. 23 is an enlarged, detailed cross-sectional view of a portion of the air injection device and valve illustrated in FIG. 22;

FIG. 24 is a top plan view of an eighth embodiment of the air gun of the present invention;

FIG. 25 is a cross-sectional view taken generally along the plane 25—25 of FIG. 24;

FIG. 26 is a cross-sectional view taken generally along the plane 26—26 of FIG. 25;

FIG. 27 is a schematic representation of the first embodiment of the air injection device of the present invention shown in alignment with a dunnage bag fill valve;

FIG. 28 is a schematic representation of the third embodiment of the air injection device of the present invention shown in alignment with a dunnage bag fill valve; and FIG. 29 is a graph illustrating the relationship between dunnage bag inflation pressure and filling time for air injection devices of the present invention having different orifice construction.

DESCRIPTION OF THE PREFERRED EMBODIMENTS

While this invention is susceptible of embodiment in many different forms, there are shown in the drawings and will herein be described in detail preferred embodiments of the invention. It should be understood, however, that the present disclosure is to be considered as an exemplification of the principles of the invention and is not intended to limit the invention to the embodiments illustrated.

In the following description, the two digit numerals are used to refer to the embodiment illustrated in FIGS. 1-7, three digit numerals in the 100 series are used to refer to the embodiment illustrated in FIGS. 8-10, three digit numerals in the 200 series are used to refer to the embodiment illustrated in FIGS. 11 and 12, three digit numerals in the 300 series are used to refer to the embodiment illustrated in FIGS. 13-16, three digit numerals in the 400 series are used to refer to the embodiment illustrated in FIGS. 17-19, three digit numerals in the 500 series are used to refer to the embodiment illustrated in FIGS. 20 and 21, and three digit numerals in the 600 series are used to refer to the embodiment illustrated in FIGS. 22 and 23, and three digit numerals in the 700 series are used to refer to the embodiment illustrated in FIGS. 24-26. The same last two digits in each numeral designates similar or functionally analogous elements in the various embodiments.

For ease of description, the apparatus of this invention will be described in a horizontal operating position, and terms such as upper, lower, horizontal, etc., will be used with reference to this normal operating position. It will be understood, however, that apparatus of this invention may be manufactured, stored, transported, sold, and used in orientation other than the position described.

Referring now to FIG. 1, there is illustrated a typical inflatable dunnage bag 32 having, on one end, a rapid fill valve device 34 which is adapted to receive and coact with the air injection device or air gun of the present invention. Typically, the dunnage bag is a multi-ply bag and is made of a plurality of plies of paper, such as Kraft paper, which form an outer shroud around a heat sealable inner, thermoplastic, film-like liner or bladder. It is to be understood, however, that the air injection device of the present invention may be used with other types of disposable and non-disposable inflatable dunnage bags, such as those discussed above in the section entitled "Background of the Invention."

Some types of dunnage bags are manufactured in different sizes having different inflated internal volumes. Also, dunnage bags may be typically manufactured for light, medium, and heavy-duty use. For example, the assignee of this invention manufactures three sizes of dunnage bags, each using a different number of plies of paper. Bags having two plies of paper are used for light-duty use and have a nominal allowable, or design, fill pressure of three pounds per square inch gauge. A medium-duty bag has four plies of paper and a nominal design pressure of five pounds per square inch gauge. The heavy-duty bag has six plies of paper and a nominal design pressure of eight pounds per square inch gauge.

For purposes of economy of manufacture, uniformity of appearance, and convenience under field use conditions, the dunnage bag fill valve 34 is preferably located in the same relative position on the three sizes of bags and has the same exterior dimensions. The use of valves having the same exterior dimensions for all three types of bags has a further advantage in that, when the dunnage bags are filled by means of the air gun of the present invention, the same size air gun can be used for all three types of bags as will be explained in more detail hereinafter. The type of valve 34 which is adapted to coact with the air injection device of the present invention is fully described in the previously cited concurrently filed application of Angarola et al., entitled "Dunnage Bag Fill Valve" and attention is directed thereto.

As illustrated in FIGS. 1, 2 and 3, the fill valve device 34 has a housing 36 extending through the wall of the dunnage bag. Preferably, the housing is substantially cylindrical and fabricated from polyethylene. FIG. 3, which shows the valve device 34 mounted in the wall of the dunnage bag, best illustrates the dunnage bag wall structure of six plies of Kraft paper 40 which form the outer shroud around a thin polyethylene bladder 42 (which is typically 4 to 6 mils in thickness).

A handle 38 extends from the housing 36 on one side of the valve 34 and can be used for carrying the dunnage bag, as well as locating the dunnage bag between cargo articles. The handle structure 38 is seen to be an essentially flat sheet (typically polyethylene) lying directly on top of the outermost one of the plies 40. A polyethylene lock washer 44 may be snapped into place around the housing 36 below an annular shoulder 45 in the housing 36 to retain the valve in the dunnage bag. The housing 36 defines a substantially cylindrical chamber 45 extending from an opening on the exterior of the bag to an opening on the interior of the bag. The chamber may have a slanted or frustoconical inlet wall 48, a straight, or cylindrical throat wall 50 and a slanted or frustoconical outlet wall 52.

A removable cap 54 may be provided to cover the exterior opening of the chamber 46 at the inlet wall 48 and is preferably adapted to sealingly engage the inlet wall 48 to prevent leakage of air from the bag after the bag has been inflated. To this end, an O-ring 56 may be provided on the inner surface of the cap 54 for compressively sealing against the frustoconical inlet 48.

Preferably, the housing 36 and cap 54 are adapted to threadingly engage whereby the cap 54 can be screwed tightly onto the housing 36 to form an effective seal. The outwardly slanting frustoconical shape of the inlet wall 48 and the mating configuration of the cap 54 permits the transference of a portion of the downward threading force directly against, and normal to, the slanted inlet wall 48 to assure sufficient compression of the O-ring 56 and, as a consequence, to provide a more effective seal.

When a fill nozzle valve device is used in a dunnage bag with an air inflation gun of the present invention, it is necessary that the valve incorporate some means for preventing flow of the air out of the dunnage bag after the bag has been inflated to the design pressure. To this end, a variety of manual and automatic (including power-actuated) valve closure devices can be effectively used to block the air flow for a few seconds while the gun is withdrawn from the dunnage bag fill valve and until the cap has been sealingly engaged with the valve. For use with the air inflation gun of the present invention, there is illustrated in FIGS. 2 through 4, a preferred embodiment of a valve means or valve closure means for sealing against a portion of the dunnage bag fill valve to block flow from the bag when the bag was inflated. A generally flat, flexibly hinged mounting means or structure 60 is disposed within the interior portion of the bag and biases the valve means, such as an annular sealing ring 62, against the portion of the housing 36 defining the interior opening of the chamber 46. Specifically, as illustrated in FIG. 4, a lower biasing disc or circular flexible sheet 64 is provided with tabs 66 which are then secured, as by friction welding, mechanical attachment, or heat sealing, to tabs 68 which project from a circular flange 70 at the bottom of the housing 36. The upper surface of the flange 70 is secured, as by heat sealing, to the underside or inside surface, of the bladder 42 to provide an airtight seal between the inside of the bladder and the valve housing 36. In operation, when the flexible sheet 64 is moved downwardly away from the valve housing 36 to open the valve, as will be explained hereinafter, the peripheral edges of the sheet 64 between the tabs 66 separate from the peripheral edge of the overlying flange 70 to provide a passage into the dunnage bag. The valve means preferably also includes a disc-like central portion of thickened reinforced central portion 72 on the biasing disc or circular flexible sheet 64.

For opening the fill valve in response to engagement with the air injection device as will be described in detail hereinafter, a stem means or valve stem 74 is preferably secured, or is integral with, the central portion 72 of the circular flexible sheet 64. The stem 74 is centered within the chamber 46 and projects upwardly into the exterior opening of the housing 36.

It can be seen that the unique construction of the valve means 62, in combination with the flexibly hinged mounting means 60, provides a substantially flat valve structure which permits the bag, when deflated, to lie generally flat. Further, the unique flexibly hinged mounting means 60 provides proper valve closure biasing action without the use of the typical helical springs that are often used in valves on inflatable objects. Also, the flexibly hinged mounting means 60 and the other valve components, such as the circular flexible sheet 64 and the valve housing 36, can be made from relatively inelastic and sturdy polyethylene which can be easily molded into the proper configuration and can be easily heat sealed where necessary to form the valve construction illustrated. It should also be noted that the flexible circular sheet 64 provides a baffle for deflecting incoming air to prevent impingement of the air on the portion of the wall of the thin, film-like bladder opposite the valve. Most importantly, the fill valve device 34 has an interior chamber 46 which provides a relatively large annular volume around the slender stem 74 to accommodate entrainment of ambient air through the valve and into the bag in cooperation with the air injection device of the present invention as will be described hereinafter.

The air injection device or inflation air gun of the present invention employs the novel concept of forming a jet pump by providing an air injection device with a novel spacing and aligning means which is adapted to coact with a suitably shaped dunnage bag fill housing or valve and which permits a jet or jets of high pressure gas or air to be discharged from orifices through the chamber of the dunnage bag fill valve housing thereby entraining or aspirating ambient air from around the air injection device through the valve and into the dunnage bag. Specifically, high pressure gas or air jets are injected into a nozzle-like chamber in the dunnage bag fill valve. As each gas jet expands from its orifice, the velocity reaches a maximum in the narrow constriction or throat area of the valve chamber. In accordance with Bernoulli's Principle, the pressure in the high velocity throat region of the chamber is substantially reduced (to a subatmospheric pressure value) and ambient air is thereby drawn, or aspirated, through the chamber. On the discharge side of the chamber (i.e., inside of the dunnage bag) there are no walls to restrict lateral expansion of the air flowing into the bag and the velocity of the fluid mixture decreases (as it must if the maximum flow rate is to remain equal throughout the length of the chamber). To the extent that the valve chamber may have a diverging section opening into the interior of the bag, the pressure will increase in that section as the velocity decreases. That is, the velocity head will be converted back to pressure head in that section. Theoretically, the jet pump effect should be typically more pronounced when the fill valve or housing has a thermodynamic nozzle shape comprising a converging inlet, a minimum diameter throat area, and a diverging discharge section.

The air injection device or inflation air gun of the present invention, designated generally by the numeral 76 in FIG. 5, is shown mounted on the valve 34 of a dunnage bag 32 during inflation of the dunnage bag. A pressurized gas conduit means or tube means for supplying pressurized gas, such as tubular member 78 is connected on one end to a conventional hand-operated pressurized gas supply on-off valve 80 which in turn is connected to a pressurized gas supply hose 82. The tubular member 78 may alternatively be directly connected to a source or supply of pressurized gas and may specifically be connected directly to the hose 82. An on-off valve, such as valve 80, may be located upstream in the hose or at a supply of pressurized gas, such as at a compressor or compressed air receiving tank. The valve 80 may be integral with the locator prong 92 for automatic opening when the gun is engaged with the valve. Alternatively, an on-off valve need not be used at all. In that case, pressurized gas can be allowed to continually discharge from the air injection device.

With reference to FIG. 6, the tubular member 78 is seem to be a substantially hollow tube which is plugged or closed at the end 79 opposite the connection to the pressurized gas supply. As best illustrated in the bottom view of FIG. 7, four orifices 88 are provided at equally spaced intervals about the perimeter of a circle in the tubular member 78 for discharging jets of pressurized gas into the dunnage bag valve. To position the tube 78 properly over the housing 36, a ring-like alignment frame 86 is mounted across its diameter to the tube 78 so that it is concentric with the circle of orifices 88. The alignment frame 86 has an annular shoulder 90 which is adapted to seat on, and engage the top of, the exterior portion of the housing 36. When the alignment frame 86 is thus engaged, the circle of orifices is concentric with the circular interior walls of the valve housing 36 and the center of the circle of orifices 88 is substantially coincident with the longitudinal axis of the cylindrical housing 36. A portion of the wall of the tube is flattened, as at 84, to accommodate the attachment of an alignment means or a ring-like alignment frame 86. The flattened section 84 further permits easier drilling of orifices 88 through the tube wall. As a result of the orifices 88 being drilled in the flattened section 84, the jets of pressurized gas discharge from the orifices in a substantially parallel relationship.

The ring-like structure of the alignment frame 86 permits free flow of ambient air past the exterior portions of the tube 78 as well as between the exterior portions of the tube 78 and the exterior portions of the valve housing 36. Thus, ambient air can be drawn into the region surrounding the orifices 88 and, under influence of the Bernoulli effect caused by the jets of high pressure gas discharging from the orifices 88 through the valve chamber 46, the air can be drawn, or aspirated, through the valve and into the dunnage bag. This action is efficiently promoted by using relatively small orifices having a relatively small combined cross-sectional flow area whereby the amount of high pressure air (or other gas) required to inflate the dunnage bag is considerably less than the amount of high pressure air required by filling devices which use only high pressure air. The efficiency is further effected by locating the orifices 88, in relation to the valve chamber 46, so that the orifices 88 are spaced from the walls of the chamber. The number of orifices and their size may be varied as desired to achieve the most efficient entrainment of ambient air for a given set of fixed conditions (e.g., a fixed valve size and shape and a fixed high pressure gas flow rate). For example, only one orifice may be provided and it may be located off-center with respect to the longitudinal axis of the valve housing 36. Alternatively, two or more orifices may be asymmetrically arranged to discharge into the chamber 46, and/or may be arranged to discharge the jets of gas in a non-parallel or skewed relationship. A single orifice means, such as an annular slit, could also be used.

In order that the jets of high pressure gas and the entrained air can be passed through the valve and into the dunnage bag, the valve closure or annular sealing ring 62 must be moved away from the sealing engagement with the interior opening of the valve housing. To this end, a prong means or prong 92 is secured to the flattened wall portion 84 of the tube 78 at the center of the circle of orifices 88 and extends downwardly to engage and depress the stem 74 when the air gun is mounted on the valve housing 36 and aligned with the chamber 46 for discharging jets of pressurized gas therein. When the stem 74 is thus depressed, the incoming air and/or gas can pass between the circular flexible sheet 64 and the valve housing flange 70 and then out through the openings at the periphery of the flange 70 and circular flexible sheet 64, between the three pairs of flexible hinge tabs 66/68 as is best illustrated in FIG. 6.

Of course, it is to be understood that the air inflation device of the present invention may be used with a dunnage bag fill housing which does not have a self-closing or automatically closing valve means. For instance, instead of having a circular flexible sheet 64 and valve means or annular sealing ring 62 as illustrated in FIG. 6, a separate, manually actuated valve means could be used. Such a valve means might consist of a pivoting or sliding closure member which could be moved into position to block flow out of the dunnage bag through the chamber 46 after the dunnage bag design fill pressure level had been reached. Also, a separately power-actuated valve closure member could be employed that would close the valve in response to either an initiation action by the operator or automatically, upon sensing of a predetermined pressure level within the dunnage bag.

When used with a suitably designed dunnage bag fill valve housing or valve, the inflation air gun of the present invention effects a most useful and advantageous phenomenon. Specifically, for a given size and shape valve, the air gun can be designed so as to effect the filling of a dunnage bag with entrained ambient air up to a specific stabilized maximum pressure level and not in excess of that level. In particular, even if the inflation air gun is left engaged with a dunnage bag fill housing or valve and is left injecting a high pressure gas jet or jets therein, the pressure within the bag will reach a certain level, at which time the pressure will not increase any further. Though the high pressure gas jets and entrained ambient air are still being directed into the fill valve housing, an equilibrium is reached where the mass flow rate of air entering the fill housing or valve equals the flow rate of air being discharged from or deflected out of, the dunnage bag in response to the internal bag pressure. Thus, with the air gun of the present invention, dunnage bags can be equipped with fill valves or housing designed to coact with the particular construction of a single, common air fill gun so that each dunnage bag can be filled to its design pressure level and so that the dunnage bag cannot possibly be overpressurized so as to rupture. Experimental test data relating to this phenomenon will be discussed following descriptions of other embodiments of the air gun of the present invention.

FIGS. 8 and 8A illustrate a second type of a dunnage bag fill valve device 134. Certain features of this type of valve are more fully described in the previously cited concurrently filed application of Angarola et al., entitled "Dunnage Bag Fill Valve", and attention is directed thereto (especially to FIGS. 12–14). Like the first type of a fill valve 34 previously described, valve 134 has a housing 136 mounted within the wall of a dunnage bag. The housing is substantially cylindrical and has an annular flange 137 which is secured, as by heat sealing, to the upper or exterior surface of a bladder 142. The flange 137 also functions to support and retain the plies 140 which lie immediately above it. An O-ring is provided inside the bag at the end of the housing 136 and functions as a valve seat. A flexibly hinged mounting means 160 is used to secure a biasing disc or circular flexible sheet 164 across the interior opening at the bottom of the valve housing 136 to provide a valve closure. The valve closure disc 164 is reinforced in its central portion by a smaller circular sheet or disc 172. Spaced equally about, and extending outwardly from, the valve disc 164 are arms 173 which are secured to, or are integral with, a bladder attachment ring 175. The ring 175 is attached, as by heat sealing, to the underside, or inside surface, of the bladder 142. Preferably, valve closure disc 164, the circular reinforcing sheet 172, and the arms 173 are made of polyethylene. The closure 164 is biased against the interior opening of the valve housing 136 by the flexibly hinged means or hinge connection 160 where the arms 173 join the bladder attachment ring 175. Thus, if the valve closure disc 164 were pushed downwardly away from the interior opening of the fill valve housing 136, the arms 173 would be pulled away from the wall of the bladder 142 also. To some extent, the wall of the bladder 142 would be pulled inwardly at the point of attachment to the ring 175 to contribute some amount of the flexible hinge action.

To open the valve 134 and allow passage of air therethrough as just described, a stem means 174 is provided in the interior chamber of the valve housing 136, and is adapted to be engaged by an air gun of the present invention as will be described hereinafter. The stem 174 is a hollow, substantially cylindrical member slidably disposed within the valve housing 136 and adapted for vertically reciprocable movement therein.

A cap 154 may be provided for threadingly engaging the valve housing 136 and the cap 154 may hold an O-ring 156 to bear against an exterior portion of the housing 136 to provide a secondary seal.

A second embodiment of the air gun of the present invention is designed to be used with the fill valve illustrated in FIGS. 8 and 8A and is designated generally as 176 in FIGS. 9 and 10. Like the first embodiment illustrated in FIGS. 6 and 7, the air gun 176 has a hollow cylindrical tube 178 for supplying pressurized gas or air to the fill valve and has a ring-like alignment frame 186 disposed at one end of the tube and mounted across its diameter to the tube. In the tube 178, at the center of the ring-like frame 186, an orifice 188 is provided for emitting a jet of pressurized gas or air. When the gun 176 is engaged with the dunnage bag fill valve 134, as illustrated in FIG. 10, the ring-like frame 186 fits around the periphery of the exterior portion of the valve 134 and aligns the orifice 188 in the center of the valve chamber so that the jet of pressurized gas or air exiting from the orifice 188 is directed into and through the valve 134. When the gun 176 is engaged with the valve 134, it must be pushed downwardly to move the stem 174 into the valve to push the valve disc 164 away from the interior opening of the valve and allow passage of the entrained ambient air therethrough. To this end, the bottom portion of the stem 174 is provided with apertures, such as the aperture 189, illustrated in FIGS. 8 and 9, through which the incoming air flows as it passes into the dunnage bag.

As can be seen, the second embodiment of the air gun 176 illustrated in FIGS. 9 and 10, has certain advantages compared to the first embodiment illustrated in FIGS. 6 and 7. Specifically, owing to the particular construction of the dunnage bag fill valve 134, there is no need to have a prong member or prong means, such as prong 92 on the air gun 76 illustrated in FIG. 6.

A third embodiment of the air gun of the present invention is illustrated in FIGS. 11 and 12. The third embodiment is designed to be used with the type of dunnage bag fill valve illustrated in FIGS. 8 and 9, that is, one that does not have a central stem means for actuating a valve closure means. The third embodiment of the air gun has a substantially hollow, cylindrical extension tube 278 with a fitting (not illustrated) on one end for connection to an air hose and a tip tube 279 disposed at a substantially right angle to the extension tube 278. As best illustrated in FIG. 12, the tip tube 279 has an orifice 288 in its distal end for the discharge of a gas or air jet. The gun is aligned over the dunnage bag fill valve with a mounting ring 286 which is secured to the tip tube 279 by a plurality of outwardly and downwardly extending legs 287. A shoulder 290 is provided within the alignment ring 286 for engaging the top portion of the dunnage bag fill valve stem, such as the top portion of stem 174 illustrated in FIG. 8.

A novel feature of the air gun of the present invention is illustrated in a fourth embodiment of the air gun in FIGS. 13 through 16. Here, an air gun substantially similar to the first embodiment of the air gun 76 (illustrated in FIGS. 5, 6, and 7) comprises a substantially hollow cylindrical tube 378 connected on one end to a manually operated on-off valve 380 which is in turn connected, through appropriate fittings, to an air supply hose 382. On the one end, the tube 378 has a flattened wall portion 384. A ring-like alignment frame 386 is secured across its diameter to the flattened wall portion 384. High pressure gas jet orifices 388 are provided in the flattened wall portion in a substantially circular array concentric with a ring-like frame 386. The frame 386 has a shoulder 390 for engaging the top portion of a fill valve housing and has a prong member 392 for engaging the stem of a dunnage bag fill valve in a manner similar to that illustrated for the first embodiment of the air gun 76 as illustrated in FIG. 6.

During inflation, it is possible that entrained air may carry with it particulate matter and that this particulate matter would pass through the valve and into the dunnage bag whereupon the particulate matter may impinge upon the wall of the bladder and puncture the bladder. Further, after the maximum stabilized pressure level has been reached in the filled dunnage bag, and before the air gun is withdrawn from engagement with the fill valve, air is flowing out from the dunnage bag fill valve and this air could carry with it some of the particulate matter that had been previously blown into the bag. To prevent particulate matter from being blown into the bag and/or from being blown out of the bag towards the operator, a novel screen device is provided on the air gun. Specifically, a cylindrical screen 394 extends upwardly from the frame 386 entirely around the peripheral portion of the frame. A disc-like end member 396 is provided across the top of the cylindrical screen. Though the disc end member 396 could also be a screen material, a solid disc material is preferred in those applications where the operator of the air gun would be using his thumb to press against the disc 396 to insure engagement of the gun with the dunnage bag fill valve.

As was previously stated, when a dunnage bag is filled with an air inflation gun of the present invention through a fill valve specifically adapted to coact with such a gun, like filling and pressurization of the bag is self-limiting as a maximum stabilized pressure level is reached in the bag. Then, regardless of the length of time that the inflation air gun is left engaged with the open fill valve, the pressure remains constant at the stabilized level and the flow rate into the bag through the valve is in equilibrium with the flow rate of air out of the bag through the valve. This out-flow or blow-back of air out of the valve can be sensed by a unique feature incorporated in the inflation air gun of the present invention as illustrated by the fifth and sixth embodiments in FIGS. 17-19 and 20-21, respectively. Specifically, an air gun 476 is illustrated in FIG. 17 as having a substantially hollow, cylindrical tube 478 which has a fitting 479 for a connection to a suitable high pressure gas or air hose (not illustrated). On the other end of the tube 478 is a flattened wall portion 484. A circular or ring-like alignment 486 is secured across its diameter to the flattened wall portion 484 on one end of tube 478 and functions to align the tube properly over the dunnage bag inflation fill valve. Orifices 488 are provided in the flattened wall portion 484 in a substantially circular array concentric with the ring-like frame 486. A screen or foraminous closure 496 is mounted to the ring-like frame 486 and extends over a portion of the tube within the frame to inhibit injection of particulate matter into the dunnage bag along with entrained air and/or to inhibit blow-back of particulate matter out of the bag.

Secured to the inside top surface of the foraminous enclosure 496 is a telltale means or strip of flexible material 497. The strip of material is a substantially rectangular planar member and is formed from a flexible material such as polyethylene with a preformed, downwardly concave arcuate configuration as best illustrated in FIG. 18. When the gun is not in use for filling a dunnage bag, the strip 497 has the orientation illustrated in FIG. 18 and as schematically illustrated in FIG. 19 by the solid line B. However, during inflation of the dunnage bag, the flow of entrained ambient air past the strip 497 causes the strip to bend about its point of attachment into a more concave configuration as schematically represented by the dashed line A in FIG. 19. When the dunnage bag has been filled to its maximum stabilized pressure level, the blow-back of the air from the fill valve forces the ends of the strip upwardly so that the strip becomes less concave as schematically illustrated by the dotted line C in FIG. 19. Thus, by observation of the amount of curvature in the strip 497, the operator can tell when the bag has been filled to its proper design, or maximum allowable, pressure level.

Another novel mechanism for indicating when a dunnage bag has been filled to its maximum stabilized pressure level with the air gun of the present invention is illustrated in FIGS. 20 and 21. There an air gun 576 is provided with a substantially hollow, cylindrical tube 578 having on one end a fitting 579 for connecting the gun to a suitable high pressure gas or air supply hose (not illustrated). On the other end of the tube 578, a portion of the wall of the tube is flattened as at 584. A ring-line alignment frame 586 is mounted across its diameter to the flattened wall portion 584 to align the gun 576 properly with the dunnage bag fill valve. Orifices 588 are provided in the flattened wall portion 584 from which high pressure air or gas jets are discharged into the dunnage bag fill valve. As best illustrated in FIG. 21, a screen 594 is mounted across the top of the frame 586 and is secured to the tube 578 to inhibit the injection of suspended particulate matter into the dunnage bag along with the entrained air and to inhibit blow-back of particulate matter. Secured or tied to the upper surface of the screen 594 are thread-like telltale strands of material 597 which are free to be blown upwardly and flutter in response to blow-back of air from the dunnage bag fill valve when the maximum stabilized pressure level is reached. When the dunnage bag is being filled, the threads 597 are drawn flat against the screen 594 by entrained ambient air. The operator can tell that the dunnage bag has been filled to its proper design pressure level when the threads 597 are blown outwardly away from the screen 594.

When a dunnage bag is being inflated with the air inflation gun of the present invention, it is necessary that the gun be mounted on, and aligned with, the dunnage bag fill housing or valve in a proper manner. To this end, the operator of the gun must use the ring-like alignment frame to engage the exterior portion of the dunnage bag fill valve as previously described for all of the gun embodiments so far illustrated. In some cases where cargo has been loaded into a freight carrier, it may be very difficult for an operator to get as close to a dunnage bag during the inflation process as he would like. The operator may have to crawl over or around cargo and assume a particularly awkward position as he inflates the dunnage bag with the air gun of the present invention. Thus, it is possible that the operator would not have an adequate visual sight line or sufficient amount of leverage to enable him to properly hold the gun in engagement with the dunnage bag fill valve. The modification illustrated in FIGS. 22 and 23 for a seventh embodiment of the air gun provides a structure for accommodating this problem, as will next be described.

The seventh embodiment of the air inflation gun of the present invention is adapted for use with a dunnage bag fill valve 634 which is similar to the previously described valve 34 illustrated in FIGS. 1 through 4. Specifically, with reference to FIG. 22, the valve 634 has a substantially cylindrical hollow housing 636 mounted in the wall of a dunnage bag wherein the wall comprises plies 640 of Kraft paper surrounding a thin film-like bladder 642. A valve means or annular sealing ring 662 is biased against the interior opening of the valve housing by a circular flexible sheet 664 which is secured through a flexible hinge mounting means 660 to the valve housing 636. Specifically, the flexible hinge means 660 comprises tabs 666, projecting from the peripheral edge of the flexible circular sheet 664, secured, as by sonic welding, mechanical attachment, or heat sealing, to tabs 668 which project from an annular flange 670 on the peripheral edge of the bottom portion of the valve housing 636. Integral with the circular flexible sheet 664 is a reinforcing disc-like central portion 672 and an upwardly extending stem means 674.

The seventh embodiment of the air inflation gun of the present invention is very similar to the first embodiment illustrated in FIGS. 5 through 7. As illustrated in FIG. 22, a substantially hollow, cylindrical tube 678 is provided with a flattened wall portion 684 to which is mounted, on the diameter, a ring-like alignment frame 686 for locating the tube 678 relative to the valve housing 636. A prong means 692 projects from the bottom of the flattened wall portion 684 in the center of a circular array of orifices 688 and is adapted for engaging the top of the valve stem 674 to force the valve open during inflation.

A novel means is provided to lock the air gun onto the valve housing 636 as best illustrated in the enlarged detail of FIG. 23. The ring-like element frame 686 has a shoulder 690 for engaging the top surface of the valve housing 636. The valve 634 is adapted to be threadingly engaged with a cap (not illustrated) via a helical thread, the upper and lower cross-sectional portions of which are designated by the numerals 695 and 696, respectively. The upper portion of the thread 695 is the beginning portion of the helical thread and is displaced downwardly from the top of the valve housing 636 by an amount sufficient to accommodate a peripheral exterior groove 698 in the cylindrical housing 636. A snap-ring flange 699 projects from a mating portion of the interior surface of the ring-like alignment frame and engages the groove 698 whereby the air inflation gun is mounted and locked to the valve housing 636. Suitable materials are used in the alignment frame 686 and the valve housing 636 so that, for a given size and configuration of the frame and housing, both the housing and the frame are inherently sufficiently deflectable to allow the snap-ring flange 699 to be forced into and out of engagement by application of a sufficient amount of force.

Once the alignment frame has been locked into position about the valve housing, the operator of the air inflation gun need not apply any force or pressure to hold the gun against the valve housing while the dunnage bag is being inflated. After the bag has been inflated to the design pressure level, the gun may be simply disengaged from the housing by cocking or tilting the tube 678 slightly to force a portion of the snap-ring flange 699 out of the annular groove 698.

An eighth embodiment of the air gun of the present invention is designed to be used with the fill valve illustrated in FIGS. 1 through 4 and is designated generally by the numeral 776 in FIGS. 24 through 26. This embodiment is essentially the same as the first embodiment 76 illustrated in FIGS. 5 through 7 and previously described herein. The basic difference is that the hollow tube for supplying pressurized gas or air is located within a surrounding wall structure or shroud, such as housing 777. This function, as will be explained in more detail hereinafter, to protect the central pressurized air conduit and to provide a chamber around the central pressurized air conduit through which ambient air may flow to the gas jet orifice region whereby it is entrained and injected into a dunnage bag.

With reference to FIG. 25, an inlet port 781 is provided at the inlet end of the gun for permitting connection to a pressurized gas supply, usually through a hose. An on-off valve 780 is provided immediately downstream of the inlet port 781 and is operated by a pivoted handle 783. Preferably, the valve is spring biased to prevent the pressurized gas from flowing through the gun from inlet port 781 but may be opened, at the will of the operator, by pressing handle 783. The valve 780 is of conventional design and, since an understanding of the detailed structure of such a valve is not necessary to an understanding of the present invention, a further detailed description is not presented here. Downstream of valve 780 is the high pressure gas conduit means or chamber 778 which has a circular transverse cross section and is defined within the central wall portion 785 of housing 777. At the end of the gun 776 opposite the valve 780, the central wall portion 785 presents a flattened wall 784 having four generally circular orifices 788 providing communication between the high pressure gas conduit or chamber 778 and the exterior of the gun. As best illustrated in FIG. 26, the four orifices 788 are provided at equally spaced intervals about the perimeter of a circle in the flattened wall 784 and function to discharge jets of pressurized gas into an adjacent dunnage bag valve (not shown).

To position the gun 776 properly over the valve (in much the same manner as the gun 76 over valve 34 as illustrated in FIG. 6 and as previously described above), a ring-like alignment frame 786 is mounted within the housing 777 so that it is concentric with the circle of orifices 788. The alignment frame 786 has an annular shoulder 790 which is adapted to seat on, and engage the top of, the exterior portion of the housing of a dunnage bag fill valve, such as valve 34 illustrated in FIGS. 1 through 4 and previously described above.

The orifices 788 are preferably right cylindrical aperrures within the wall 784 and are oriented such that their central longitudinal axes are parallel. Thus, the jets of high pressure gas are discharged in substantially parallel alignment through the orifices 788. As is best seen in FIG. 26, passageways 791 are defined by housing 777 on either side of central wall portion 785. The passageways 791 communicate with the exterior of the gun on the valve end. Thus, ambient air is free to enter the passageways 791 and flow to, and around, the discharge end of the high pressure gas conduit chamber 778 where the four orifices 788 are located. When high pressure gas is discharged through the orifices 788, the ambient air within the passageways 791 adjacent the orifices 788 is aspirated past the orifices and through an adjacent dunnage bag valve to fill the dunnage bag.

For a given size and shape dunnage bag fill valve and for a given available pressure level at the gas or air supply, the air inflation gun of the present invention can be judiciously designed to optimize the length of time required to fill a dunnage bag to a specific pressure level. Further, the gun can be designed to fix the maximum stabilized pressure level to which the bag can be filled. The principles of such design can be best explained with reference to the schematic representations in FIGS. 27 and 28. In both figures, a dunnage bag fill housing or valve is schematically represented and designated by the numeral 834. The valve 834 is mounted in the wall 840 of a dunnage bag. The valve housing is substantially cylindrical and defines an interior chamber 846 which has a frustoconical converging wall structure or inlet 848, a substantially cylindrical wall structure or throat 850 at the minimum cross-sectional area of the chamber 846, and a frustoconical diverging wall structure or outlet 852. In FIG. 27, an air inflation gun similar to the first embodiment illustrated in FIGS. 5–7 is schematically represented as having a tube portion 878 with orifices 888. Since the tube 878 is shown in cross-section in FIG. 27, only two of four orifices 888 are shown. It is to be understood that four orifices are arranged in a generally circular array as is illustrated for the first embodiment in FIG. 7. In FIG. 28, an air inflation gun of the type similar to the third embodiment illustrated in FIGS. 11 and 12 is schematically represented by a tube 978 having a single orifice 988.

Tests have been conducted with inflation air guns of the present invention similar to the type schematically represented in FIGS. 27 and 28 wherein a number of the guns' physical parameters were varied for a given dunnage bag valve shape and size. Some of the experiments were conducted to determine how changes in the number of gun orifices, the orifice size, and the orifice configuration affect the dunnage bag maximum stabilized pressurization level and the time required to fill a dunnage bag to its maximum stabilized pressurization level. A gun of the type illustrated in FIGS. 5 through 7 was experimentally compared with a gun of the type illustrated in FIGS. 11 and 12, and the results of the experiment are depicted in FIG. 29, which is a graph of dunnage bag pressure versus filling time for the two different types of guns. The curve A corresponds to the multi-orifice gun of FIGS. 5 through 7 and the curve B corresponds to the single orifice gun of the type illustrated in FIGS. 11 and 12. The valves used with each gun were nearly identical and, with reference to FIGS. 27 and 28, the various parameters of the valve design were fixed as follows:

(1) The inlet angle $\theta_{IN}$, was 45°
(2) The throat diameter, T, was 0.421 inches
(3) The outlet angle, $\theta_{OUT}$, which is schematically represented as being identical in FIGS. 24 and 25, was actually 0° for the valve used with the single orifice gun (FIG. 27) and was 30° for the valve used with the multi-orifice gun (FIG. 28). But this does not affect the test results since it was determined by other experimentation that variation in outlet angle between 0° and 30° had a negligible effect on dunnage bag filling time where all the other parameters were maintained at about the values listed here with respect to this test.
(4) The inlet diameter, $D_{IN}$, was 0.906 inches (5) The valves were mounted in 6-ply dunnage bags having an internal inflated volume of 11.76 cubic feet.

The parameters relative to the inflation air guns were set at the following values:

(1) The multi-orifice gun (FIG. 27 and curve A in FIG. 29) had four orifices equally spaced about a 0.25 inch diameter circle (as best illustrated in FIG. 7), each having a diameter, O, of 0.073 inches.

(2) The single orifice gun (FIG. 28 and curve B in FIG. 29) had a single circular orifice diameter, O, of 0.156 inches.

(3) The distance between the orifices of each gun and the top of the throat of the valve $L_o$, was 0.36 inches.

(4) Each gun was supplied with 80 psi gauge air pressure through a 10 ft. length of standard ⅜ inch nominal internal diameter air hose. Under full flow conditions, the measured pressure at the gun inlet was 62 psi gauge.

As can be seen from the curves in FIG. 29, the single orifice gun, represented by curve B, filled with dunnage bag to about 9 psi at which point the pressure stabilized at that maximum level. In contrast, the multi-orifice gun, represented by curve A, filled the dunnage bag to a little over 10 psi, at which time the bag pressure stabilized to that maximum level. It is also of interest to note that while the single orifice gun required 50 seconds to fill the bag to 9 psi, the multi-orifice gun required only a little over 30 seconds to fill the bag to the same 9 psi pressure level. However, it should be noted that the stabilized pressurization level for either gun was reached at about the same time, that is, at between 50 and 55 seconds. It should be noted that the higher stabilized pressurization level was achieved with the multi-orifice gun in which the sum of the cross-sectional areas of the orifices was actually slightly less than the cross-sectional area of the orifice of the single orifice gun. Thus, when filling 6-ply bags having volumes of around 12 cubic feet to pressures of between 9 and 10 psi through the valves used in the test and with high pressure air supply pressures of 80 psi, the multi-orifice design appears to be more efficient in that it will give a higher stabilized pressure level compared to a single orifice design having the same or slightly larger cross-sectional flow area.

By other testing, it was found that the multi-orifice air inflation gun (FIG. 7) with four orifices each having a diameter, O, of 0.073 inches equally spaced around a 0.25 inch circle entrained or aspirated air into the dunnage bag at a ratio of 4 to 5 times the flow rate of the high pressure jet or jets and that it is possible, by using specific combinations of orifice sizes and fill valve throat diameters, to achieve substantially higher flow ratios.

Experiments were conducted to determine the relationship between the maximum stabilized pressurization level and the distance between the dunnage bag fill valve and the inflation air gun orifice. It was found that variation of the distance between the valve and the gun orifice (e.g., distance $L_o$ in FIG. 28) would cause a variation in the maximum pressurized stabilization pressure. It was also found that the time required to fill a bag to the maximum stabilized pressurization level did not vary significantly with the change in orifice distance $L_o$ in the range between 0 and 1 inch — at least for the practical values of the parameters that were tested (e.g. $\theta_{IN} = 45°$, $\theta_{OUT} = 0°$, T = 0.421 inches, 6-ply dunnage bag volume of 11.76FT$^3$, single gun orifice diameter O = 0.156 inches, and 80 psi gauge air supply). Thus, for a given bag and valve structure, the gun alignment frame can be appropriately designed to position the gun orifices relative to the valve to effect, within limits, the desired stabilized pressurization level.

One of the features and advantages of the novel inflation air gun of the present invention is that a single gun, having a specific configuration and dimensions, can be used with a number of differently configured and sized fill valves in dunnage bags whereby the dunnage bags can be inflated to different predetermined maximum stabilized pressure levels corresponding to the safe design limits for each bag. For example, it has been found that one gun can be used to fill three different size dunnage bags.

In particular, it was desired to inflate 6-ply, 4-ply, and 2-ply dunnage bags, each having a volume of 11.76 cubic feet, to their nominal design pressure rating of 8 psi, 5 psi, and 3 psi, respectively. The bags were equipped with fill valves similar to the one illustrated in FIGS. 1 through 4. With reference now to FIG. 24, the inlet angle $\theta_{IN}$, was set at 45° for all bags and the outlet angle, $\theta_{OUT}$, was set at 30° for the 6- and 4-ply bags and at 15° for the 2-ply bag. The overall length of the valve, from the exterior opening to the interior opening was about 0.65 inches for all three valves. The throat diameter, T, was set at 0.421 inches, 0.531 inches, and 0.625 inches for the 6-, 4-, and 2-ply bags, respectively. The air inflation gun, identical in configuration to the gun 76 illustrated in FIGS. 5 through 7, was then developed to fill the 6-, 4-, and 2-ply bags to their respective nominal design pressures. The four orifice holes in the gun were equally spaced about a 0.25 inch diameter circle and each hole had a diameter, O, of 0.073 inches. When the gun was mounted on each valve, the orifices were maintained 0.125 inches above the valve by the alignment frame of the gun. The gun was supplied with air at 80 psi gauge static pressure at the upstream end of a 61 ft. length of standard ⅜ inch nominal internal diameter air hose. Under full flow conditions, the measured pressure at the gun inlet was 62 psi gauge. An 80 psi supply pressure and a 61 ft. hose length would be typical for conditions encountered in the field. When such a gun was used to inflate the 6-, 4-, and 2-ply bags having the fill valves with dimensions described above, the bags were inflated to a safe allowable maximum stabilized pressurization level of 8.5 psi, 5.4 psi, and 3.5 psi, respectively.

Thus, it can be seen that the novel air injection device of the present invention can be designed for use with a specific size dunnage bag having a given size and shape valve. By appropriate selection of the orifice configuration, orifice size, orifice to valve distance, and supply air pressure, the air injection device can be designed to effect any desired maximum stabilized pressurization level within the bag.

Of course, for ease of use in the field, it would be most convenient to use a single gun (with a standard length of hose and air supply pressure) that could be used to fill any of the three types of bags to a stabilized pressurization level equal to the safe design pressure limit of each bag. However, it would be possible to use only one size and shape of valve in the different types of bags and to require the operator to vary the supply pressure to the air inflation gun as necessary (as predetermined by experiment) to automatically fill each bag to a stabilized pressurization level equal to the safe design pressure level for the particular bag. This is not to be recommended, however, since the operator could make a careless adjustment of the supply pressure and overpressurize a bag, thereby causing its rupture.

It should be understood that the novel air injection apparatus of the present invention could be used with suitably designed valves on many types of dunnage bags, including single ply (paper or non-paper) disposable bags and including reusable bags, such as those having a rubber, fabric, or plastic wall structure.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. An air injection device for rapidly filling an inflatable dunnage bag with entrained ambient air, said dunnage bag having a housing defining a chamber extending from an opening on the exterior of the bag to an opening in the interior of the bag, said air injection device comprising:
   pressurized gas conduit means for supplying pressurized gas adjacent said housing;
   alignment means movable relative to said housing and secured to said conduit means for locating said conduit means relative to said housing and in alignment with said chamber, said alignment means spaced from portions of said conduit means whereby ambient air can flow past exterior portions of said conduit means to said chamber; and
   orifice means associated with said conduit means for discharging at least one jet of pressurized gas, said orifice means positioned on said conduit means in spaced relation from the walls of the chamber when said conduit means is aligned with said chamber whereby at least one jet of pressurized gas is directed into said chamber to aspirate ambient air past said orifice means and through the chamber into the dunnage bag.

2. An air injection device for rapidly filling an inflatable dunnage bag with entrained ambient air, said dunnage bag having a housing defining a chamber extending from an opening on the exterior of the bag to an opening in the interior of the bag, said air injection device comprising:
   pressurized gas conduit means for supplying pressurized gas adjacent said housing;
   alignment means movable relative to said housing and secured to said conduit means for locating said conduit means relative to said housing and in alignment with said chamber, said alignment means spaced from portions of said conduit means whereby ambient air can flow past exterior portions of said conduit means to said chamber; and
   orifice means associated with said conduit means and spaced from the walls of said chamber when said conduit means is aligned with said chamber for discharging at least one jet of pressurized gas into said chamber and at the same time aspirating ambient air from past said orifice means and through the chamber into the dunnage bag.

3. The air injection device in accordance with claim 2 further comprising screen means for inhibiting injection of suspended particulate matter into said dunnage bag along with the entrained air during inflation and for inhibiting blow-back of particulate matter.

4. The air injection device in accordance with claim 2 further comprising a thumb plate secured to said alignment means whereby force may be exerted upon the plate with an operator's thumb to hold said gas discharge means on said housing.

5. The air injection device in accordance with claim 2 further comprising a telltale means for being deflected away from said exterior housing opening in response to blow-back out of said exterior housing opening when the dunnage bag inflation pressure reaches a predetermined level.

6. An air injection device for rapidly filling an inflatable dunnage bag with entrained ambient air, said dunnage bag having a housing defining a chamber extending from an opening on the exterior of the bag to an opening in the interior of the bag, said air injection device comprising:
   tube means for supplying pressurized gas adjacent said housing;
   an alignment frame means movable relative to said housing and secured to said tube means for locating said tube means relative to said housing and in alignment with said chamber, said alignment frame means spaced from portions of said tube means whereby ambient air can flow past exterior portions of said tube means to said chamber; and
   orifice means associated with said tube means and spaced from the walls of said chamber when said tube means is aligned with said chamber for discharging at least one jet of pressurized gas into said chamber and at the same time aspirating ambient air from between said orifice means and said chamber through the chamber into the dunnage bag.

7. The air injection device in accordance with claim 6 in which said tube means comprises an extension tube having a fitting in one end for connection to an air hose and a tip tube on the other end, said tip tube disposed at a substantially right angle to said extension tube and in which said orifice means comprises one gas jet discharge orifice in the distal end of said tip tube.

8. The air injection device in accordance with claim 7 in which said alignment frame means comprises a plurality of legs extending outwardly and downwardly from said tip tube and a mounting ring secured to the ends of said legs concentric with said orifice.

9. The air injection device in accordance with claim 8 in which said mounting ring has an annular shoulder for engaging thereon an exterior portion of said housing.

10. The air injection device in accordance with claim 6 in which said tube means comprises a straight tube closed on one end and having a fitting on the other end for connection to one of an air hose and an air hose mounted on-off gas supply valve.

11. The air injection device in accordance with claim 10 in which said straight tube has a flattened wall portion and in which said orifice means comprises circular gas jet discharge orifices therein, said orifices spaced at equal intervals about the perimeter of a circle in said flattened wall portion.

12. The air injection device in accordance with claim 11 in which said alignment frame means comprises a ring-like frame mounted across its diameter to the flattened wall portion of said tubular member concentric with said circle of orifices, said frame having an annular shoulder for engaging thereon an exterior portion of said housing.

13. The air injection device in accordance with claim 12 further comprising a cylindrical screen extending upwardly from said ring-like frame and a solid, disc-like end member mounted across the top of said cylindrical screen to inhibit the injection of particulate matter into the dunnage bag along with the entrained air and to inhibit blow-back of particulate matter.

14. The air injection device in accordance with claim 12 further comprising a foraminous enclosure mounted to said ring-like frame and extending over the portion of said tube within said ring-like frame to inhibit the injection of particulate matter into the dunnage bag along with the entrained air and to inhibit blow-back of particulate matter.

15. The air injection device in accordance with claim 12 further comprising a screen mounted across the top of said ring-like frame and secured to said tubular member to inhibit the injection of particulate matter into the dunnage bag along with the entrained air and to inhibit blow-back of particulate matter.

16. The air injection device in accordance with claim 6 further comprising a thumb plate secured to said alignment frame means whereby force may be exerted upon the plate with an operator's thumb to hold said discharge means on said housing.

17. The air injection device in accordance with claim 6 further comprising a telltale means for being blown away from said exterior housing opening in response to blow-back out of said exterior housing opening when the dunnage bag inflation bag pressure reaches a predetermined level.

18. The air injection device in accordance with claim 17 in which said telltale means comprises at least one thread-like strand secured on one end whereby it is free to flutter.

19. The air injection device in accordance with claim 17 in which said telltale means comprises a strip of flexible material formed into a downwardly concave arcuate configuration and secured adjacent said orifice means whereby the arcuate configuration of said strip becomes more concave during dunnage bag inflation and becomes less concave in response to blow-back out of said exterior housing opening when the dunnage bag inflation bag pressure reaches a predetermined level.

20. The air injection device in accordance with claim 6 further comprising a hand-held, hand-operated pressurized gas supply on-off valve connected to said tube means for feeding the supply of pressurized gas.

21. An air injection device for separately and rapidly filling a plurality of inflatable dunnage bags with entrained ambient air, said dunnage bags having differing design inflation pressure limits, all said bags of each particular design inflation pressure limit having a self-closing fill valve of a certain size, said valve having a substantially cylindrical housing defining a chamber extending from an opening on the exterior of the bag to an opening in the interior of the bag, a valve means inside the bag for blocking said interior opening to prevent flow through the valve, and stem means disposed within said chamber for being engaged and depressed by said air injection device to urge said valve means away from said interior opening during inflation of said bag thereby allowing passage of air through the valve, said air injection device comprising:

a straight, tubular member for supplying pressurized gas, said tubular member having a closure on one end and a fitting on the other end for connection to an air supply, said tubular member further having a flattened wall portion with circular gas jet discharge orifices therein, said orifices spaced at equal intervals about the perimeter of a circle in said flattened wall portion;

a prong means for engaging and depressing said valve stem means, said prong means depending from the center of said circle of orifices in the flattened wall portion of said tubular member; and a ring-like alignment frame movable relative to said housing mounted across its diameter to the flattened wall portion of said tubular member concentric with said circle of orifices, said frame spaced from portions of said tubular member, said frame having an annular shoulder for engaging thereon the exterior end of said cylindrical housing of said fill valve to align said orifices over said chamber thereby permitting the jets of pressurized gas to pass through said chamber whereby ambient air is aspirated through the chamber and into the dunnage bag.

22. The air injection device in accordance with claim 21 in which said cylindrical housing has a peripheral exterior groove and in which said alignment frame has a snap-ring flange means for engaging said groove whereby said air injection device can be mounted and locked to said fill valve.

23. An air injection device for rapidly filling an inflatable dunnage bag with entrained ambient air, said dunnage bag having a valve housing defining a chamber extending from an opening on the exterior of the bag to an opening in the interior of the bag, said valve housing having a valve means inside the bag and means for moving said valve means against said interior opening for blocking said interior opening to prevent flow through the valve housing, said air injection device comprising:

means for engaging and moving said valve means to open said valve means;

pressurized gas conduit means for supplying pressurized gas adjacent said housing;

alignment means movable relative to said housing and secured to said conduit means for locating said conduit means relative to said housing and in alignment with said chamber, said alignment means spaced from portions of said conduit means whereby ambient air can flow past portions of said conduit means to said chamber; and orifice means associated with said conduit means and spaced from the walls of said chamber when said conduit means is aligned with said chamber for discharging at least one jet of pressurized gas into said chamber and at the same time aspirating ambient air past said orifice means and through the chamber into the dunnage bag.

* * * * *